(12) United States Patent
Barak (10) Patent No.: US 10,125,428 B2
(45) Date of Patent: Nov. 13, 2018

(54) ELECTRODIALYSIS STACKS, SYSTEMS, AND METHODS FOR RECOVERING AMMONIA AND MONOVALENT SALTS FROM ANAEROBIC DIGESTATE

(71) Applicant: Nutrient Recovery & UpCycling, LLC, Madison, WI (US)

(72) Inventor: Phillip Barak, Madison, WI (US)

(73) Assignee: Nutrient Recovery & Upcycling, LLC, Madison, WI (US)

( * ) Notice: Subject to any disclaimer, the term of this patent is extended or adjusted under 35 U.S.C. 154(b) by 330 days.

(21) Appl. No.: 14/695,702

(22) Filed: Apr. 24, 2015

(65) Prior Publication Data

US 2015/0308001 A1    Oct. 29, 2015

Related U.S. Application Data

(60) Provisional application No. 61/983,618, filed on Apr. 24, 2014.

(51) Int. Cl.
*C02F 1/46* (2006.01)
*C25B 7/00* (2006.01)
(Continued)

(52) U.S. Cl.
CPC .............. *C25B 7/00* (2013.01); *C02F 1/4693* (2013.01); *C25B 9/08* (2013.01); *C02F 1/20* (2013.01);
(Continued)

(58) Field of Classification Search
CPC . C25B 7/00; C25B 9/08; C02F 1/4693; C02F 2103/20; C02F 11/04; C02F 2101/16
See application file for complete search history.

(56) References Cited

U.S. PATENT DOCUMENTS 5,578,181 A    11/1996  Hirose et al.
6,187,201 B1 *  2/2001  Abe ..................... B01D 61/58
                                                         204/529
(Continued)

FOREIGN PATENT DOCUMENTS

EP          2074066        5/2010
WO     WO 2011130809     10/2011
(Continued)

OTHER PUBLICATIONS

International Search Report and Written Opinion mailed in PCT/US2015/027516, dated Jul. 14, 2015.
(Continued)

*Primary Examiner* — Arun S Phasge
(74) *Attorney, Agent, or Firm* — Bell & Manning, LLC (57) ABSTRACT

Electrodialysis stacks comprising a series of electrodialysis cells and anaerobic digestion systems incorporating the electrodialysis stacks are provided. Also provided are methods of using the electrodialysis stacks and systems to recover nitrogen, in the form of ammonia, from separated anaerobic digestate. The electrodialysis stacks use monovalent-selective cation exchange membranes to concentrate ammonium ions and other monovalent ions in a concentrate stream, while discriminating against multivalent cations, which, as a result, are retained in a diluate stream. The electrodialysis stacks may use monovalent-selective anion exchange membranes to discriminate against multivalent anions, which, as a result, are selectively retained in a diluate stream.

26 Claims, 5 Drawing Sheets

(51) Int. Cl.
   *C25B 9/08*    (2006.01)
   *C02F 1/469*   (2006.01)
   *C02F 11/04*   (2006.01)
   *C02F 101/16*  (2006.01)
   *C02F 103/20*  (2006.01)
   *C02F 1/20*    (2006.01)

(52) U.S. Cl.
   CPC ........... *C02F 11/04* (2013.01); *C02F 2101/16* (2013.01); *C02F 2103/20* (2013.01)

(56) References Cited

U.S. PATENT DOCUMENTS

| | | |
|---|---|---|
| 6,207,039 B1 | 3/2001 | Moulton et al. |
| 6,217,743 B1 | 4/2001 | Moulton et al. |
| 2001/0040093 A1 | 11/2001 | Mani |
| 2010/0282674 A1 | 11/2010 | Barak |
| 2013/0015135 A1 | 1/2013 | Ganzi et al. |

FOREIGN PATENT DOCUMENTS

| | | |
|---|---|---|
| WO | WO 2011150473 | 12/2011 |
| WO | WO 2014056048 | 4/2014 |

OTHER PUBLICATIONS

Extended European Search Report mailed in European Application No. 15783049.8, dated Oct. 5, 2017.

Ippersiel et al., Nitrogen potential recovery and concentration of ammonia from swine manure using electrodialysis coupled with air stripping, Journal of Environmental Management, vol. 95, Jun. 11, 2011, pp. S165-S169.

Desloover et al., Electrochemical Resource Recovery from Digestate to Prevent Ammonia Toxicity during Anaerobic Digestion, Environmental Science & Technology, vol. 46, Oct. 10, 2012, pp. 12209-12216.

Mondor et al., Use of electrodialysis and reverse osmosis for the recovery and concentration of ammonia from swine manure, Bioresource Technology, 2007, doi:10.1016/j.biortech.2006.12.039.

Mondor et al., Fouling characterization of electrodialysis membranes used for the recovery and concentration of ammonia from swine manure, Bioresource technology 100, Aug. 30, 2008, pp. 566-571.

\* cited by examiner

FIG. 1: Table 1. Example Anaerobic Digestate for Ammonia Recovery

| Anaerobic Digestate Producing Plant | Digester Feed | pH | NH$_4$-N | K$^+$ | Na$^+$ | Ca$^{2+}$ | Mg$^{2+}$ | PO$_4$-P | Cl$^-$ | Alk.* |
|---|---|---|---|---|---|---|---|---|---|---|
| *Municipal Anaerobic Digestate Producing Plants* | | | | | | | | | | |
| Madison, WI | GBT** Filtrate | 7.14 | 739 | 187 | 275 | 99 | 43 | 35 | 1108 | 2340 |
| Dupage, IL | Belt Press Filtrate | 8.35 | 1980 | 230 | 167 | 29 | 2 | 250 | 360 | 4900 |
| *Methane-Producing Dairy Manure Anaerobic Digester* | | | | | | | | | | |
| Vienna, WI | Centrate | 7.85 | 1810 | 2716 | 921 | 62 | 338 | 21 | 965 | 10250 |
| *Methane-Producing Whey Anaerobic Digester* | | | | | | | | | | |
| (Withheld) | Filtrate | 6.81 | 145 | 482 | 169 | 67 | 38 | 55 | 637 | 650 |
| *Anaerobic Digestate from Swine Manure Lagoon* | | | | | | | | | | |
| Arlington, WI | Supernatant | 7.95 | 512 | 425 | 81 | 88 | 25 | 14 | 241 | 2411 |

* Alkalinity calculated as mg CaCO$_3$/L based on charge deficit between cations and anions.
** Gravity Belt Thickener

ELECTRODIALYSIS STACKS, SYSTEMS, AND METHODS FOR RECOVERING AMMONIA AND MONOVALENT SALTS FROM ANAEROBIC DIGESTATE

CROSS-REFERENCE TO RELATED APPLICATIONS

The present application claims priority from U.S. provisional patent application No. 61/983,618, filed on Apr. 24, 2014, the entire contents of which are hereby incorporated by reference.

REFERENCE TO GOVERNMENT RIGHTS

This invention was made with government support under 13-CRHF-0-6055 awarded by the National Institute of Food and Agriculture, USDA. The government has certain rights in the invention.

BACKGROUND

In the United States, vast quantities of nitrogen are sent from homes and industries to centralized wastewater treatment plants. Much of the nitrogen passing through a modern wastewater treatment plant practicing Biological Nutrient Removal (BNR) is intentionally nitrified, then denitrified, and volatilized to be discharged into the atmosphere, mainly as dinitrogen ($N_2$) gas with small amounts of $N_2O$, to dispose of it. Moreover, much of the nitrogen is collected as solids and anaerobically digested into the form of ammonium only to be subsequently diluted into a larger flux for further treatment. Paradoxically, at the same time wastewater treatment plants are diluting, discharging and disposing of nitrogen, the fertilizer industry is, with great effort and expense, fixing atmospheric nitrogen with natural gas using the Haber-Bosch process for fertilizer production.

Anaerobic digestion of solid wastes has long been practiced in the wastewater industry as a method to reduce the amount and environmental impact of solids separated from wastewater and, more recently as an optimized process for generating energy, gaining broader application in animal feeding operations, dairies and food processing facilities. During anaerobic digestion, microorganisms convert organic matter into carbon dioxide and methane, which are gases. Soluble nutrient ions, among them ammonium, potassium, monohydrogen phosphate and dihydrogen phosphate, are concentrated in the anaerobic digest at levels much greater than the original wastewater. Nitrogen is prevented from oxidation from ammonium to nitrate by the prevailing anaerobic conditions of the digestion process.

Attempts have been made to recover nitrogen from raw wastewater via electrodialysis. Specifically, electrodialysis has been investigated as an approach for recovering ammonia from swine manure. For example, Mondor et al. (2008, 2009) used electrodialysis coupled with reverse osmosis for the recovery and concentration of ammonia, estimating a maximum total ammonium—N concentration of about 16 g/L could be reached. They found that over time a significant deposit, calcium carbonate and silica colloidal particles, formed on the ion-exchange membranes and the ion-exchange capacity could only be partially restored after cleaning, making long-term use of the electrodialysis system infeasible. Mondor, M., Masse, L., Ippersiel, D., Lamarche, F. and Masse, D. I., 2008, Use of electrodialysis and reverse osmosis for the recovery and concentration of ammonia from swine manure, Bioresource Technology 99, pg: 7363-7368; and Fouling characterization of electrodialysis membranes used for the recovery and concentration of ammonia from swine manure, M. Mondor, D. Ippersiel, F. Lamarche, L. Masse, Bioresource Technology 100 (2009) 566-571.

SUMMARY

Electrodialysis stacks comprising a series of electrodialysis cells are provided. Also provided are anaerobic digestion systems incorporating the electrodialysis stacks and methods of using the electrodialysis stacks to concentrate ammonium in the separated liquor of an anaerobic digestate. Lastly, provided are methods of recovering ammonia and monovalent salts from the concentrated effluent of the electrodialysis stack to produce a commercial fertilizer product.

One embodiment of an electrodialysis stack comprises: an anode; a cathode; one or more monovalent-selective cation exchange membranes; and one or more anion exchange membranes, which may be monovalent-selective anion exchange membranes.

The monovalent-selective cation exchange membranes and the anion exchange membranes are disposed in an alternating arrangement between the anode and the cathode, such that a plurality of cell compartments are defined in the stack. The cell compartments comprise: a cathode cell compartment defined between the cathode and an anion exchange membrane; an anode cell compartment defined between the anode and a monovalent-selective cation exchange membrane; a plurality of diluate cell compartments, each defined between a monovalent-selective cation exchange membrane and its adjacent anion exchange membrane; and a plurality of concentrate cell compartments, each defined between an anion exchange membrane and its adjacent monovalent-selective cation exchange membrane.

One embodiment of a method for concentrating ammonium from the separated liquor of anaerobic digestate comprising ammonium ions, other cations, and anions using the electrodialysis stack comprises: feeding a separated anaerobic digestate influent into the diluate cell compartments, wherein monovalent cations selectively pass through the cation exchange membranes into the adjacent concentrate cell compartments to provide a concentrate stream that is concentrated in ammonium ions and other monovalent cations, and multivalent cations are selectively retained in the diluate cell compartments to provide a diluate stream; passing the diluate stream out of the electrodialysis stack as a diluate effluent; feeding a first portion of the concentrate stream back into the concentrate cell compartments; feeding a second portion of the concentrate stream into the cathode cell compartment, wherein ammonium ions react with hydroxide produced at the cathode to form ammonia in a cathode stream; recovering the ammonia from the cathode stream; and passing the concentrate stream out of the electrodialysis stack as a concentrate effluent to be further processed by ammonia separation methods and methods of recovering monovalent salts. The extent of concentrating the recovered salts in the concentrate stream is limited by the solubility of the bicarbonate salts of ammonium, potassium and sodium.

One embodiment of a system for recovering ammonia from the separated liquor of anaerobic digestate comprising ammonium ions, other cations, and anions, comprises: an electrodialysis stack, as described above; an anaerobic digestate source configured to feed a separated anaerobic digestate influent into the diluate cell compartments; feeding a portion of the concentrate stream into the cathode cell compartment; and an ammonia separator configured to accept an effluent from the cathode cell compartment and to separate ammonia from the effluent. The ammonia separation may comprise air or steam sparging of the concentrate effluent, with recovery of either ammonia by refrigeration or ammonium sulfate, nitrate or phosphate by passing the ammonia stream through solutions of the appropriate acids: sulfuric, nitric or phosphoric acids, respectively.

One embodiment of a system for recovering ammonium salts includes the refrigeration of the concentrated effluent of the electrodialysis stack, which has been concentrated in both ammonium and bicarbonate ions, to produce solid ammonium bicarbonate precipitates.

Another embodiment includes the low-temperature distillation of the concentrated effluent of the electrodialysis stack, which has been concentrated in both ammonium and carbonate ions, at 50 to 80° C. to volatilize ammonium bicarbonate, which is recovered in pure form upon cooling to ambient temperature.

Another embodiment includes the recirculation of one part of the concentrate stream stripped of ammonium and ammonia back into the concentrate stream and the treatment of the second part of the stripped stream for recovery of potassium, phosphate and other desired ions in the separated anaerobic digestate concentrated by the electrodialysis system.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Electrodialysis stacks comprising a series of electrodialysis cells are provided. Also provided are anaerobic digestion systems incorporating the electrodialysis stacks and methods of using the electrodialysis stacks to concentrate ammonium in the separated liquor of anaerobic digestate. Lastly, provided are methods of recovering ammonia and monovalent salts from the concentrated effluent of the electrodialysis stack to produce a commercial product, such as a fertilizer.

Figure 1:
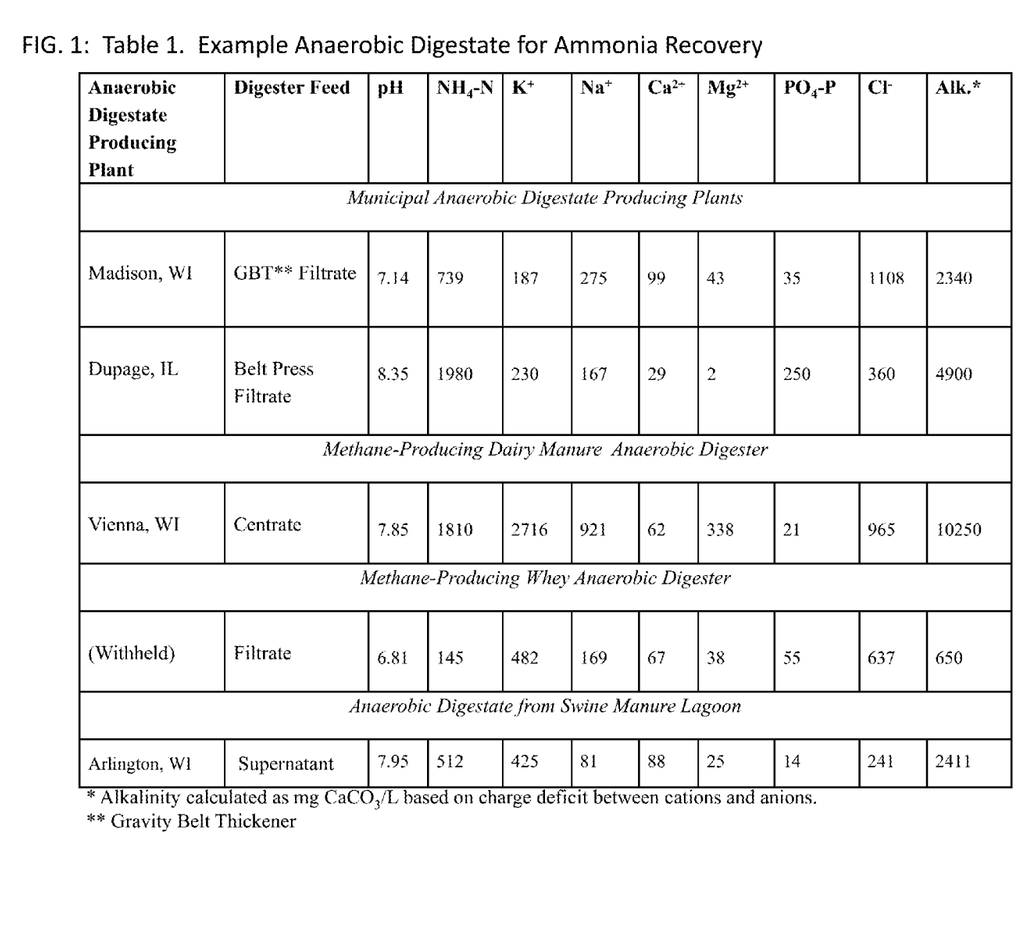
FIG. 1 is a table listing examples of anaerobic digestate influents that can be processed in the electrodialysis stacks.

The electrodialysis stacks are used in systems and methods for recovering nitrogen from anaerobic digestate. In the electrodialysis systems, an anaerobic digestate source is configured to feed a separated anaerobic digestate influent into the diluate cell compartments. This separated anaerobic digestate may be a filtrate, including that from a gravity belt thickener or belt press or centrate produced by a continuous centrifuge. The anaerobic digestate may be produced from various sources, including sewage waste, food and beverage processing waste, industrial processing waste, manure waste and abattoir waste. Therefore, by way of illustration only, the separated anaerobic digestate influent may comprise anaerobic digestate from an anaerobic digestion system used in a municipal sewage treatment facility, a manure anaerobic digester, or a food processing by-product anaerobic digester. Manure lagoons are essentially natural anaerobic digesters in which manure solids decompose under anaerobic conditions and the supernatants or filtrates of manure lagoons may be considered as anaerobic digestates for this purpose. Substantially similar digests may be produced from organic solids by application of acid or base, with added heat or pressure. FIG. 1 lists five examples of anaerobic digestate sources from which ammonia and monovalent salts can be recovered using the present electrodialysis stacks and methods. The pH, alkalinity, and ions present in the digestate from each source are provided. The dissolved ion concentrations, if provided, are in mg/L, ppm.

The use of digestate, rather than wastewater, in the present systems is advantageous because recovery of nutrients from raw wastewater (regardless or origin) is not viable due to large concentrations of N, P and other nutrients being present in the solid phase. Therefore, pretreatment and conditioning of a wastewater stream in order to transform it into digestates (from biological, physical or chemical digestions; or a combination thereof) that make them suitable for nutrient recovery by means of the present systems and methods.

Figure 2A:
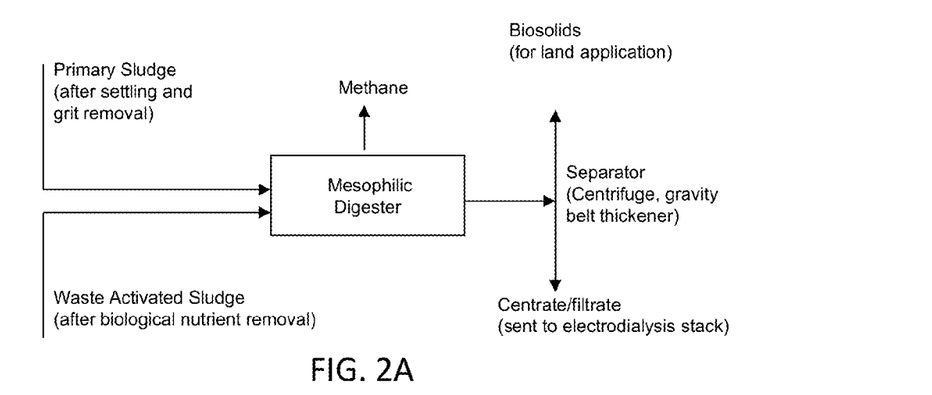
FIG. 2A is a schematic diagram of a single-phase anaerobic digestion system.
Figure 2B:
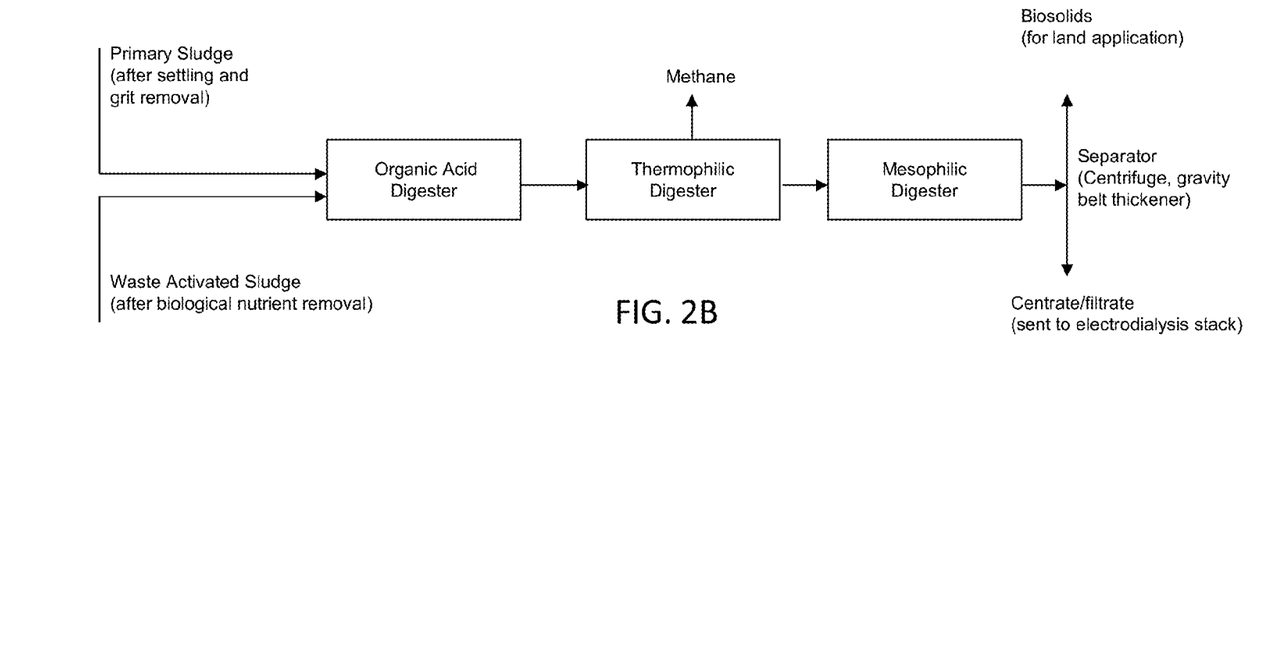
FIG. 2B is a schematic diagram of a multiphase anaerobic digestion system.

FIGS. 2A and 2B are schematic diagrams of anaerobic digestion systems comprising one or more digestion chambers that can be used to produce an anaerobic digestate for use in the electrodialysis cells. FIG. 2A shows a single-phase mesophilic anaerobic digestion system comprising a mesophilic anaerobic digester into which a primary sludge, a waste activated sludge, or both is introduced and from which an anaerobic digestate is released. This anaerobic digestate can be separated into a primarily solids portion (biosolids) and a primarily liquid portion (e.g., a centrate or filtrate) using an appropriate separator, such as a centrifuge or gravity belt thickener. This liquid portion of the digestate can then be used as the influent for an electrodialysis stack. FIG. 2B shows a multiphase anaerobic digestion system comprising a sequence of an organic acid digester, a thermophilic digester and a mesophilic anaerobic digester. This type of digestion system is used to optimize environmental conditions for the several microbial processes involved in anaerobic digestion and thereby enhance methane production in the thermophilic phase and produce biosolids with reduced pathogen content. Key to the multi-phase process is the organic acid digester, which produces low molecular weight organic acids from digestible carbohydrates at mesophilic temperatures by processes of acidogenesis and acetogenesis, with a retention time of several days. The organic acid digest then passes to the thermophilic digester where, at higher temperature and higher pH, the microbial process of methanogenesis produces methane in the form of biogas. Like the digestate produced by the single-phase anaerobic digestion system of FIG. 2A, the digestate of the multiphase digestion system of FIG. 2B can be separated into a primarily solid portion (biosolids) and a primarily liquid portion, and the liquid portion of the digestate can be used as the influent for an electrodialysis stack. Alternatively, a liquid portion of the digestate from one of the upstream digesters in the multiphase system can be siphoned off and used as the influent for an electrodialysis stack.

The electrodialysis stacks use monovalent-selective cation exchange membranes to concentrate ammonium ions and other monovalent cations in a concentrate stream, while discriminating against multivalent cations, which, as a result, are retained in a diluate stream. The use of monovalent-selective cation exchange membranes is advantageous because it reduces or substantially eliminates the transfer of low-value multivalent cations, such as calcium and magnesium, into the concentrate stream. For an anaerobic digestate influent that contains multivalent cations that would form precipitates in the process stream, the present stacks retain those dissolved ions in the diluate stream, rather than allowing them to pass into the concentrate stream where they would form precipitates of calcium carbonates, calcium sulfates, calcium phosphates, magnesium ammonium phosphates and other undesirable mineral deposits on the membranes and in the electrodialysis stack. Further, retaining calcium and magnesium in the diluate stream reduces the current needed to carry out their electrodialysis, thereby rendering the stacks more energy efficient than stacks that use cation exchange membranes that do not discriminate based on ionic valence. In addition, by preserving high concentrations of multivalent cations and their counter ions in the diluate stream, the electrodialysis stacks reduce ionic depletion during the course of electrodialysis relative to stacks that use cation exchange membranes that do not discriminate based on ionic valence. As a result, the present stacks require a lower driving voltage and, therefore, have reduced power consumption.

Some embodiments of the electrodialysis stacks also use monovalent-selective anion exchange membranes. These embodiments may further enhance the energy efficiencies of the stacks by reducing—or even substantially eliminating—the transfer of low-value multivalent anions, such as sulfate ions and humate- or fulvate-like multivalent anions, into the concentrate stream. Moreover, because the monovalent-selective anion exchange membranes discriminate against such multivalent anions, they significantly reduce membrane fouling by those anions, if present.

Monovalent-selective ion exchange membranes are commercially available and be purchased from, for example: Neosepta, Astom Corp., Japan; Selemion, AGC Engineering Co., Japan;—PC Cell, Polymerchemie Altmeier GmbH, Germany; Ionics, Inc. GE Infrastructure—Water & Process Technologies, USA; Ultrex, Membranes International, Inc., USA.

Figure 3:
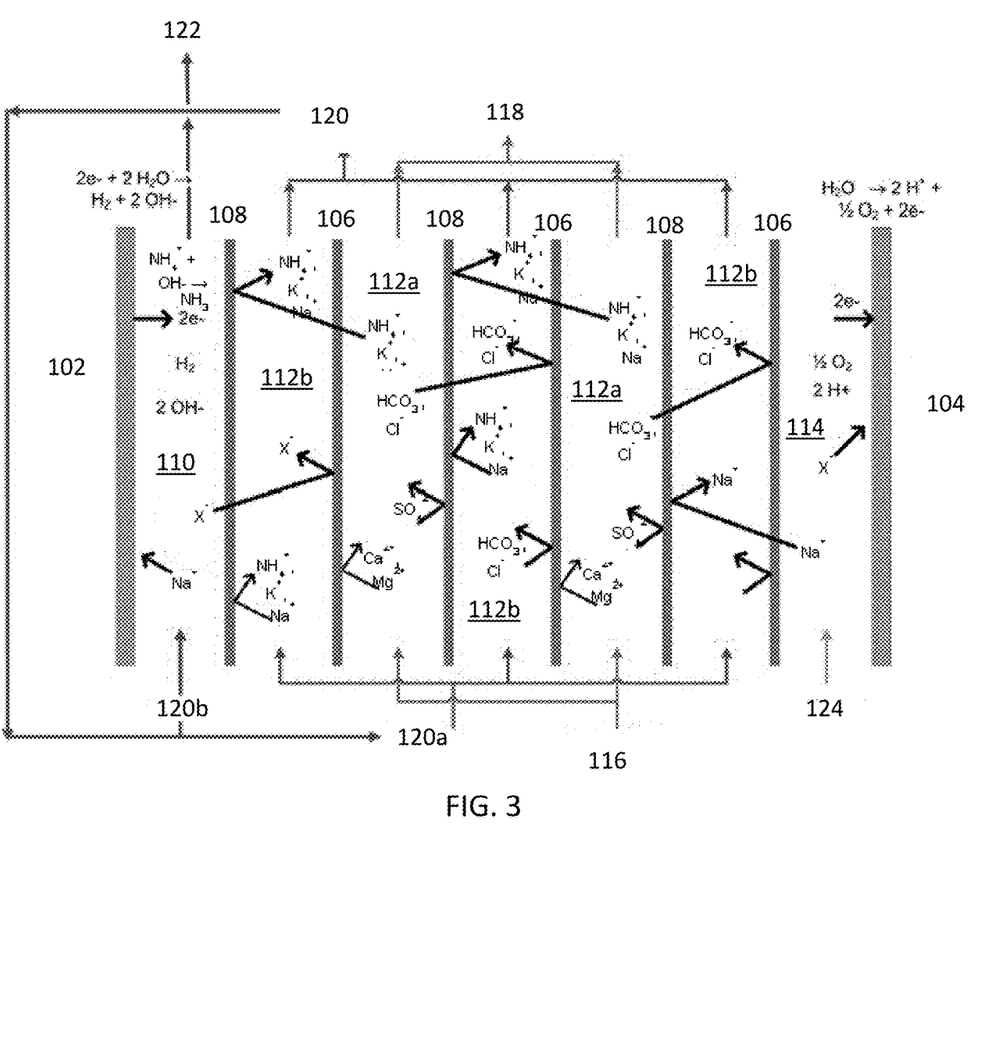
FIG. 3 is a schematic diagram of an electrodialysis stack comprising a series of monovalent-selective cation exchange membranes and monovalent-selective anion exchange membranes.

FIG. 3 is a schematic illustration of one embodiment of an electrodialysis stack that comprises monovalent-selective cation exchange membranes and anion exchange membranes. As illustrated in the figure, the electrodialysis stack comprises a cathode 102, an anode 104, one or more monovalent-selective cation exchange membranes 106, and one or more anion exchange membranes 108. For purposes of illustration anionic membranes 108 in this embodiment are monovalent-selective anion exchange membranes. However, non-selective anion exchange membranes can also be used. Monovalent-selective cation exchange membranes 106 and monovalent-selective anion exchange membranes 108 are disposed in an alternating relationship between cathode 102 and anode 104. The anode, cathode and ion exchange membranes are contained within a housing with spacers (not shown). Within the stack, a cathode cell compartment 110 is defined between cathode 102 and its adjacent anion exchange membrane 108 and an anode cell compartment 114 is defined between anode 104 and it adjacent cation exchange membrane 106. A plurality of electrodialysis cell compartments 112a and 112b are defined between adjacent cation and anion exchange membranes in the stack.

During electrodialysis, an electrical potential is applied across the anode and cathode, which are immersed in an ionic influent. This causes the charged cations and anions to move toward the cathode and anode, respectively. The movement of the ions is further controlled by the monovalent-selective cation exchange membranes and monovalent-selective anion exchange membranes, each only (or substantially only) allowing monovalent cations or monovalent anions, respectively, to pass through. Electrodialysis generally uses a low voltage (e.g., a voltage of 25 VDC or less) to drive the current against the electrical resistance provided by the influent and product solutions. The power required to run the electrodialysis can be provided by conventional sources or from photovoltaic cells, methane-powered generators, or other sources.

Figure 4:
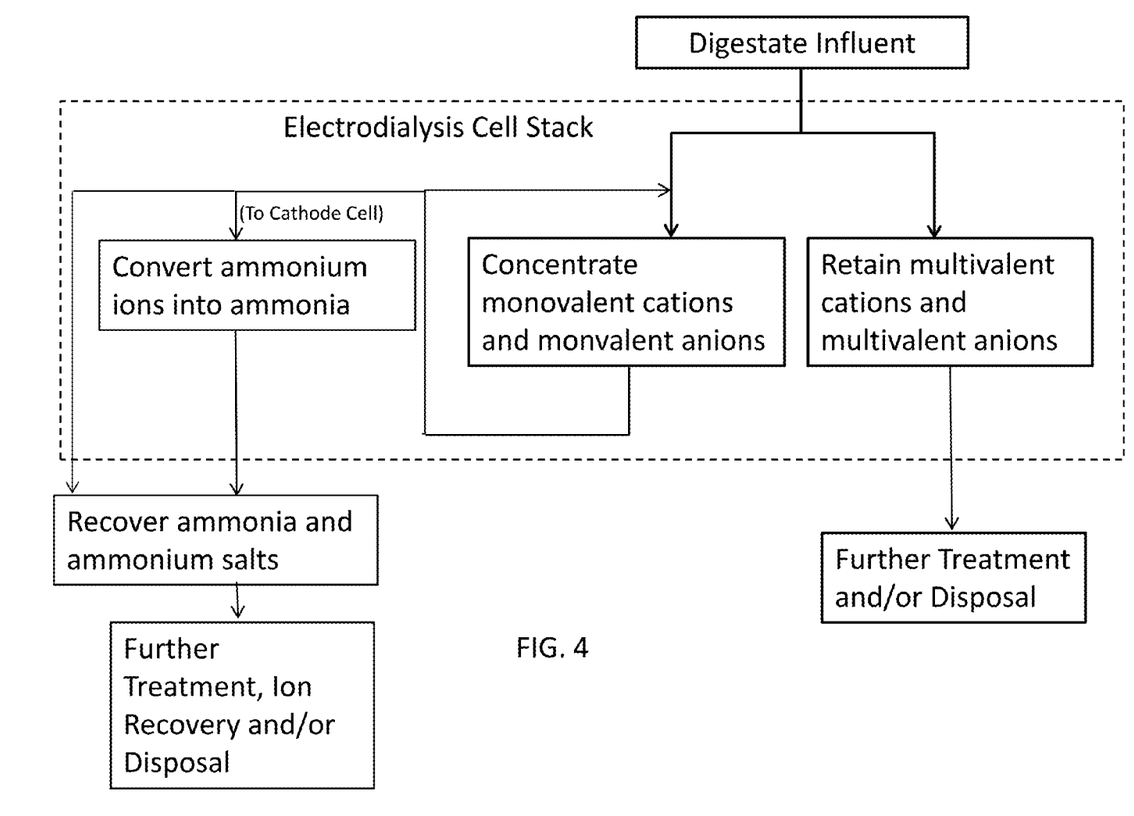
FIG. 4 is a process flow diagram illustrating the processing flow used in an electrodialysis stack.

The process flow for a method of recovering nitrogen, in the form of ammonia and monovalent salts, from the separated liquor of anaerobic digestate using an electrodialysis stack is represented by the arrows in FIG. 3 and the process flow diagram of FIG. 4. A separated anaerobic digestate influent 116 is fed into a first subset of electrodialysis cell compartments 112a where ions undergo cation exchange and anion exchange with membranes 106 and 108. As a result, multivalent cations and multivalent anions are selectively retained in the product streams in the first set of electrodialysis cell compartments (diluate cell compartments) 112a, while monovalent cations, including ammonium ions, and monovalent anions pass through the membranes to become concentrated in the product streams of a second set of electrodialysis cell compartments (concentrate cell compartments) 112b. The diluate effluent 118 from diluate cell compartments 112a is passed out of the stack for further processing and/or disposal. Channels, such as pipes or tubing, are provided to separate concentrate effluent 120 from concentrate cell compartments 112b into a first portion 120a and a second portion 120b. Portion 120a is fed back into concentrate cell compartments 112b, where it undergoes further electrodialysis to further enhance its concentration of monovalent cations and monovalent anions. Optionally, second portion 120b of effluent 120 is fed into cathode cell compartment 110, where ammonium ions are converted into ammonia, either partially or wholly, through reactions with hydroxide ions produced at cathode 102. The effluent 122 from cathode cell compartment 110 (cathode effluent) is then passed out of the stack and the ammonia recovered. Monovalent salts may be recovered from 120a after sufficient recirculation in the concentrate cell compartments.

Concentrate effluent from the concentrate cell compartments can be cycled back through the concentrate cell compartments multiple times until a desired monovalent ion concentration has been achieved, at which point the concentrate effluent can be passed out of the stack for ammonia and ammonium recovery, further processing and/or disposal. Embodiments of the methods that utilize single-cycle diluate effluent production in combination with multi-cycle concentrate effluent production allow for the continuous production of a product stream with a very high ion concentration from which ions can be continuously removed. By way of illustration only, some embodiments of the electrodialysis methods produce a concentrate effluent that has an ammonium ion concentration that is at least 1400% greater than that of the initial separated anaerobic digestate influent and reaches a concentration of about 28,000 mg ammonium-N per liter, constrained by the solubility of ammonium bicarbonate at room temperature.

Some embodiments of the methods include the additional step of passing a portion of the concentrate stream 120b through the cathode cell compartment 110 (the cathode stream) in order to raise or maintain the pH in the product stream. The pH of the product stream is desirably between 9 and 10 because alkaline conditions facilitate the conversion of ammonium to ammonia. However, an advantage of the present methods is that by utilizing the hydroxide produced at the cathode via electrolysis of water to convert ammonium ions into ammonia, the amount of chemical base that would otherwise be required is reduced. Optionally, additional chemical base may be added to the product stream 122 to complete the conversion of ammonium to ammonia.

In the embodiment of the process shown in FIG. 3, separated anaerobic digestate influent 116 comprises ammonium ions, potassium ions, sodium ions, calcium ions, magnesium ions, bicarbonate ions, chloride ions, monohydrogen and dihydrogen phosphate ions and sulfate ions. As a result, diluate effluent has approximately unchanged concentrations of calcium ions, magnesium ions and sulfate ions; concentrate effluent 120 is concentrated in ammonium ions, potassium ions, bicarbonate ions and chloride ions; and cathode effluent 122 contains ammonia and is concentrated in ammonium ions, potassium ions, bicarbonate ions and chloride ions. However, the ion content of the separated anaerobic digestate influent, and therefore the ion content of each effluent, will depend on the source and nature of the anaerobic digestate being treated. In particular, phosphate ions in the form of monohydrogen phosphate (divalent) and dihydrogen phosphate (monovalent) also may be present, in a ratio that reflects the pH of the water.

In embodiments of the electrodialysis stacks that use non-selective anion exchange membranes (that is, anion exchange membranes that do not selectively discriminate against multivalent anions,) multivalent anions in the influent will pass through the anion exchange membranes and become concentrated in the concentrate streams along with the monovalent anions. Such an embodiment permits concentration of phosphate ions, both monohydrogen phosphate and dihydrogen phosphate, in the concentration stream if desired.

The ammonia and monovalent salts in the alkaline cathode effluent can be separated from other components of the effluent using a variety of ammonia separators and separation techniques. For example, the cathode effluent can be passed through an ammonia stripping column where it undergoes vacuum or sparging with air or steam to transfer the ammonia from the liquid phase to the gas phase. The vaporized ammonia can then be recovered by condensation upon refrigeration or by neutralization in an acid trap containing a strong acid, such as sulfuric acid, nitric acid or phosphoric acid, to produce ammonium sulfate, ammonium nitrate or ammonium phosphate. A description of ammonia stripping can be found in Mondor, M., Masse, L., Ippersiel, D., Lamarche, F. and Masse, D. I., 2008, Use of electrodialysis and reverse osmosis for the recovery and concentration of ammonia from swine manure, Bioresource Technology 99, pg: 7363-7368; and in U.S. Pat. No. 2,519,451.

Ammonium bicarbonate and ammonium carbonate from the cathode and concentrate effluents can also be recovered via thermolytic distillation (e.g., at 50-80° C.) of the effluents using a vacuum distillation column to separate ammonia and carbon dioxide, followed by condensation of the ammonia. This process is described in greater detail in McGinnis, R. L., Hancock, N. T., Nowosielski-Slepowron, and M. S., McGurgan, G. D. 2013, Pilot demonstration of the $NH_3/CO_2$ forward osmosis desalination process on high salinity brines, Desalination 312:67-74.

After the removal of ammonia and ammonium salts from the concentrate effluent, other ions, such as potassium ions and phosphate ions, can be removed from the concentrate effluent and/or cathode effluent. For example, phosphate ions will cross through the anion exchange membranes in response to the electrical field if non-selective anion exchange membranes are employed. Phosphate then can be recovered from the concentrate stream by a number of known technologies.

The electrodialysis stacks described here can be deployed singly or arranged with multiple stacks in parallel to scale to treat the volumes of anaerobic digestate that may be produced at a single source and can be arranged in series, i.e., consecutively stages, to extract yet more ammonium, potassium and phosphate from the separated anaerobic digestate at each stage.

Although the electrodialysis stacks discussed above all include monovalent-selective cation exchange membranes, the electrodialysis stacks can also comprise non-valent-selective cation exchange membranes in combination with monovalent-selective anion exchange membranes. Such a stack could have the same basic layout as the electrodialysis stack shown in FIG. 3, except that membranes 106 would be non-valent-selective cation exchange membranes and membranes 108 would be monovalent-selective anion exchange membrane. The monovalent anion membranes would let only (or substantially only) monovalent anions pass into the concentrate streams. Then acidification of the concentrate streams (for example, by routing through the anode cell compartment) could be carried out in order to eliminate bicarbonate from the system and thus produce concentrate streams free of carbonates, but loaded with salts of various cations with monovalent anions, such as chloride, monovalent phosphate, nitrate and other monovalent ions. These ions can later be manipulated in a controlled fashion to separate their various salts by precipitation, distillation or other means.

EXAMPLE

The laboratory electrodialysis stack was constructed from 10 Neosepta CMS monovalent cation exchange membranes, 10 Neosepta ACS monovalent anion exchange membranes and 22 flow spacers with alternating slits. Mesh screens were placed in the void of each flow spacer to increase turbulence and convective transport near the membranes. Electrical potential was applied by a BK Precision 1788 DC power supply attached to two platinum-plated titanium electrodes with an active area of 232 sq. cm. each. A Cole-Parmer Masterflex 7523-20 peristaltic pump fitted with a Cole Parmer 7536-04 4-channel pump head was used to pump solution into the Diluate, Concentrate and Electrode Rinse streams with flow rates tested between 100 and 1200 mL/min. The system was designed to accommodate several different flow-patterns, including a single pass-through, a recirculating concentrate stream, and a recirculation/remix to conserve solutions.

Figure 5:
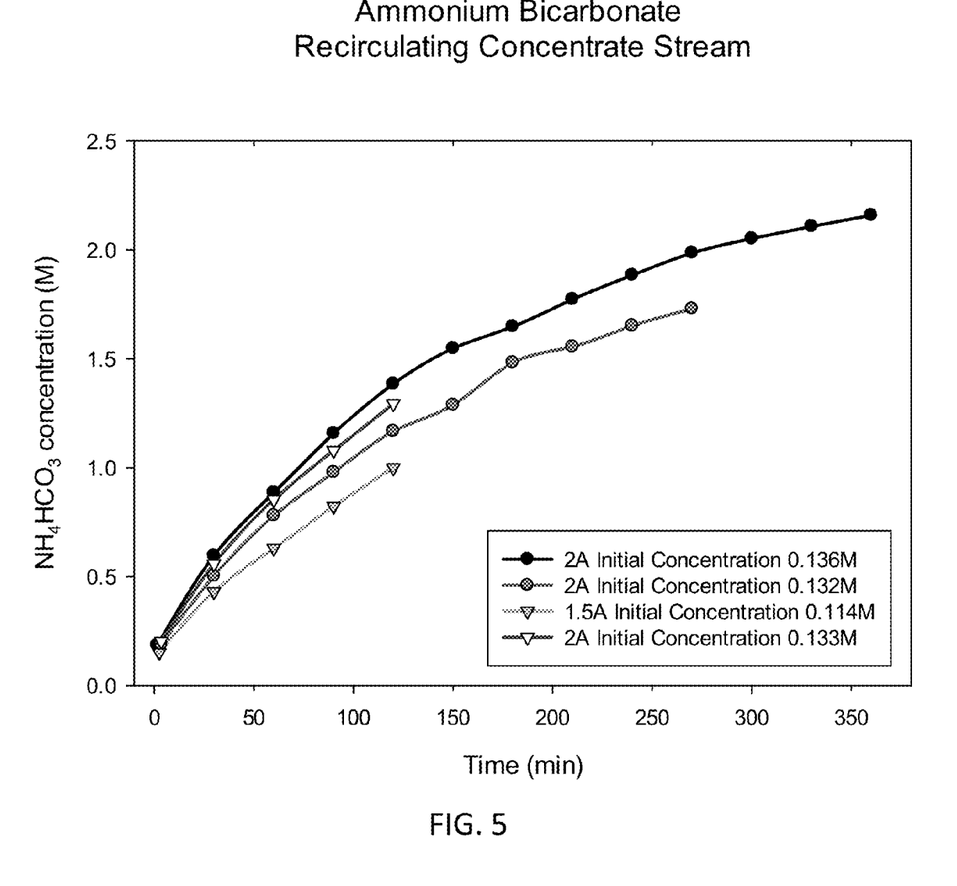
FIG. 5 is a graph showing the ammonium bicarbonate concentration in a recirculating concentrate stream as a function of time for anaerobic digestate influents having different initial ammonium bicarbonate concentrations.

A 2000 ppm N ammonium bicarbonate solution was run through the electrodialysis stack in single-pass mode at a flow rate of 300 mL/min with an applied current of 1.5 or 2 A, near the limiting current density. The increase in concentration the recirculated concentrate stream (FIG. 5) was calculated from in-line electrical conductivity readings, verified with colorimetric ammonia analysis of grab samples. The maximum desired solution concentration, ~2 moles per liter, is set by the solubility of ammonium bicarbonate at 25° C.

A synthetic solution was prepared containing 143 mM ammonium bicarbonate, 1.9 mM magnesium chloride, 1.3 mM potassium phosphate, 0.6 mM potassium sulfate, 5 mM potassium bicarbonate and 5 mM sodium bicarbonate and fed into the diluate stream in order to examine the monovalent selective capacity of the electrodialysis stack against a concentrate stream of 143 mM ammonium bicarbonate and an electrode rinse solution of 143 mM potassium nitrate. Operating conditions of the electrodialysis stack were a flow rate of 300 mL/min and a voltage sweep of 8-14 V, providing a current of 1.2-1.5 A. Grab samples were analyzed by ICP-OES and magnesium was below detection limits in the concentrate stream. Potassium was found to be preferentially mobile, with a transfer ratio of 1.81 over ammonium, and sodium least mobile with a transfer ratio of 0.57 over ammonium. Additionally, no discernable sulfate was detected in the concentrate stream. Chloride was found to be preferentially mobile, with a transfer ratio of 1.79 over bicarbonate, and at this pH, phosphate was determined to have a low mobility with a transfer ratio of 0.29 over bicarbonate. In parallel experiments, permeability of calcium was similarly below detection limits. These data demonstrate that the monovalent selective ion exchange membranes are suitable to prevent the formation of calcium and magnesium scale in the concentrate stream.

Unbuffered potassium nitrate was pumped at 300 mL/min through the cathode and anode cells of the above-described electrodialysis stack as electrode rinse solution. The steady state pH of the cathode cell was pH 11 and that of the anode was 3. The base generated at the cathode was sufficient to titrate 250 mg ammonium to ammonia per hr in a 232 sq. cm cathode cell.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for recovering ammonia, monovalent salts or both from separated anaerobic digestate comprising ammonium ions, other cations, and anions using an electrodialysis stack comprising:
   an anode;
   a cathode;
   one or more monovalent-selective cation exchange membranes; and
   one or more anion exchange membranes;
   wherein the monovalent-selective cation exchange membranes and the anion exchange membranes are disposed in an alternating arrangement between the anode and the cathode, such that a plurality of cell compartments are defined in the stack, the cell compartments comprising: a cathode cell compartment defined between the cathode and an anion exchange membrane; an anode cell compartment defined between the anode and a monovalent-selective cation exchange membrane; a plurality of diluate cell compartments, each defined between a monovalent-selective cation exchange membrane and its adjacent anion exchange membrane; and a plurality of concentrate cell compartments, each defined between an anion exchange membrane and its adjacent monovalent-selective cation exchange membrane;
   the method comprising:
   (a) feeding a separated anaerobic digestate influent into the diluate cell compartments, wherein monovalent cations selectively pass through the cation exchange membranes into the concentrate cell compartments to provide a concentrate stream that is concentrated in ammonium ions and other monovalent cations, and multivalent cations are selectively retained in the diluate cell compartments to provide a diluate stream;
   (b) passing the diluate stream out of the electrodialysis stack as a diluate effluent, such that precipitation of salts of the multivalent cations in the electrodialysis stack is avoided;
   (c) recycling the concentrate stream back into the concentrate cell compartments to further increase the concentration of ammonium ions and other monovalent cations in the concentrate effluent;
   (d) passing the concentrate stream out of the electrodialysis stack as a concentrate effluent; and
   (e) recovering one or more salts of the monovalent cations from the concentrate effluent.

2. The method of claim 1, further comprising recovering ammonia from the concentrate effluent.

3. The method of claim 1, wherein the one or more anion exchange membranes are monovalent-selective anion exchange membranes, such that the concentrate stream is concentrated in monovalent cations and monovalent anions.

4. The method of claim 1, further comprising feeding a portion of the concentrate stream into the cathode cell compartment, wherein ammonium ions react with hydroxide produced at the cathode to form ammonia in the cathode stream, and recovering the ammonia from the cathode stream.

5. The method of claim 4, further comprising adding a base to the cathode stream.

6. The method of claim 1, wherein the separated anaerobic digestate influent comprises potassium ions, sodium ions, chloride ions, bicarbonate ions, calcium ions, magnesium ions, and sulfate ions.

7. The method of claim 1, wherein the separated anaerobic digestate influent and the concentrate effluent comprise potassium ions, the method further comprising recovering the potassium ions from the concentrate effluent.

8. The method of claim 1, wherein the separated anaerobic digestate influent and the concentrate effluent comprise phosphate ions, the method further comprising recovering the phosphate ions from the concentrate effluent.

9. The method of claim 1, wherein the separated anaerobic digestate influent and the concentrate effluent comprise ammonium and bicarbonate ions and the method further comprises recovering ammonium bicarbonate from the concentrate effluent.

10. The method of claim 9, wherein recovering ammonium bicarbonate comprises cooling the concentrate effluent to produce solid ammonium bicarbonate precipitates.

11. The method of claim 9, wherein recovering ammonium bicarbonate comprises distilling the concentrate effluent to volatilize ammonium bicarbonate, capturing the volatilized ammonium bicarbonate and condensing the captured ammonium bicarbonate.

12. The method of claim 1, further comprising: recovering ammonium salts and ammonia from the concentrate effluent; subsequently recycling the concentrate effluent back into the concentrate cell compartments; and subsequently recovering ions from the concentrate effluent.

13. The method of claim 12, wherein the recovered ions comprise potassium ions and phosphate ions.

14. The method of claim 1, wherein the separated anaerobic digestate influent comprises a digestate from a municipal anaerobic biodigester.

15. The method of claim 1, wherein the separated anaerobic digestate influent comprises anaerobic digestate from a manure lagoon.

16. The method of claim 1, wherein the separated anaerobic digestate influent is from an anaerobic digestion system used in a wastewater treatment facility.

17. The method of claim 16, wherein the wastewater treatment facility is a municipal sewage treatment facility.

18. The method of claim 1, wherein the separated anaerobic digestate influent is the effluent from a mesophilic anaerobic digester that digests a primary sludge, a waste activated sludge, or an effluent from an upstream thermophilic digester.

19. A system for recovering ammonia from anaerobic digestate comprising ammonium ions, other cations, and anions, the system comprising:
(a) an electrodialysis stack comprising:
an anode;
a cathode;
one or more monovalent-selective cation exchange membranes; and
one or more anion exchange membranes;
wherein the monovalent-selective cation exchange membranes and the anion exchange membranes are disposed in an alternating arrangement between the anode and the cathode, such that a plurality of cell compartments are defined in the stack, the cell compartments comprising: a cathode cell compartment defined between the cathode and an anion exchange membrane; an anode cell compartment defined between the anode and a monovalent-selective cation exchange membrane; a plurality of diluate cell compartments, each defined between a monovalent-selective cation exchange membrane and its adjacent anion exchange membrane; and a plurality of concentrate cell compartments, each defined between an anion exchange membrane and its adjacent monovalent-selective cation exchange membrane;
(b) an anaerobic digestate source configured to feed a separated anaerobic digestate influent into the diluate cell compartments; and
(c) an ammonia separator configured to accept an effluent from the cathode cell compartment and to separate ammonia from the effluent.

20. The system of claim 19, wherein the ammonia separator comprises an ammonia stripping column.

21. The system of claim 19, wherein the one or more anion exchange membranes comprise monovalent-selective anion exchange membranes.

22. The system of claim 19, wherein the one or more anion exchange membranes comprise non-valent-selective anion exchange membranes.

23. The system of claim 19, wherein the anaerobic digestate source is an anaerobic digestion system used in a wastewater treatment facility.

24. The system of claim 23, wherein the wastewater treatment facility is a municipal sewage treatment facility.

25. The system of claim 19, wherein the anaerobic digestate source is a mesophilic anaerobic digester that digests a primary sludge, a waste activated sludge, or an effluent from an upstream thermophilic digester.

26. A method for recovering cation salts, monovalent anion salts or both from separated anaerobic digestate comprising cations, bicarbonate anions, other monovalent anions, and multivalent anions using an electrodialysis stack comprising:
an anode;
a cathode;
one or more monovalent-selective anion exchange membranes; and
one or more cation exchange membranes;
wherein the monovalent-selective anion exchange membranes and the cation exchange membranes are disposed in an alternating arrangement between the anode and the cathode, such that a plurality of cell compartments are defined in the stack, the cell compartments comprising: a cathode cell compartment defined between the cathode and a monovalent-selective anion exchange membrane; an anode cell compartment defined between the anode and a cation exchange membrane; a plurality of diluate cell compartments, each defined between a monovalent-selective anion exchange membrane and its adjacent cation exchange membrane; and a plurality of concentrate cell compartments, each defined between an cation exchange membrane and its adjacent monovalent-selective anion exchange membrane;
the method comprising:
(a) feeding a separated anaerobic digestate influent into the diluate cell compartments, wherein bicarbonate ions and other monovalent anions selectively pass through the monovalent-selective anion exchange membranes into the concentrate cell compartments to provide a concentrate stream that is concentrated in bicarbonate ions and other monovalent anions, and multivalent anions are selectively retained in the diluate cell compartments to provide a diluate stream;
(b) passing the diluate stream out of the electrodialysis stack as a diluate effluent;
(c) feeding at least a portion of the concentrate stream into the anode cell compartment, wherein the bicarbonate ion concentration is reduced via acidification to provide an anode cell effluent that has a reduced bicarbonate ion concentration;
(d) passing the anode cell effluent out of the electrodialysis stack; and
(e) recovering one or more salts of the cations and other monovalent anions from the anode cell effluent.

* * * * *